United States Patent [19]

Welch et al.

[11] Patent Number: 4,698,614
[45] Date of Patent: Oct. 6, 1987

[54] PTC THERMAL PROTECTOR

[75] Inventors: Richard E. Welch, Lexington; Robert L. Newman, Mansfield, both of Ohio

[73] Assignee: Emerson Electric Co., St. Louis, Mo.

[21] Appl. No.: 848,161

[22] Filed: Apr. 4, 1986

[51] Int. Cl.⁴ .............................................. H01C 7/10
[52] U.S. Cl. .............................. 338/22 R; 338/22 SD; 338/25; 338/26; 338/30; 338/328; 338/332; 219/544
[58] Field of Search ................... 338/22 R, 22 SD, 25, 338/26, 30, 226, 328, 332, 333, 243, 230, 254, 277; 219/544; 337/102

[56] References Cited

U.S. PATENT DOCUMENTS 4,327,282  4/1982  Nauerth ......................... 338/22 SD
4,395,623  7/1983  Shimoda et al. ............... 338/22 SD
4,399,423  8/1983  Nield .................................. 337/102

Primary Examiner—E. A. Goldberg
Assistant Examiner—M. M. Lateef
Attorney, Agent, or Firm—Polster, Polster and Lucchesi

[57] ABSTRACT

A thermal protector using a polymeric PTC element, with broad upper and lower surfaces, sandwiched between and held in intimate mechanical and electrical contact over substantially its entire broad surfaces with inner broad surfaces of upper and lower plate-terminals. Electrical insulation between the upper and lower plate-terminals outside the areas of contact of the plate-terminals and the PTC element electrically insulates the upper and lower plate-terminals from one another. The plate-terminals are clamped mechanically, preferably in such a way that the PTC element is biased continuously against the broad surfaces of the plate-terminals.

18 Claims, 19 Drawing Figures

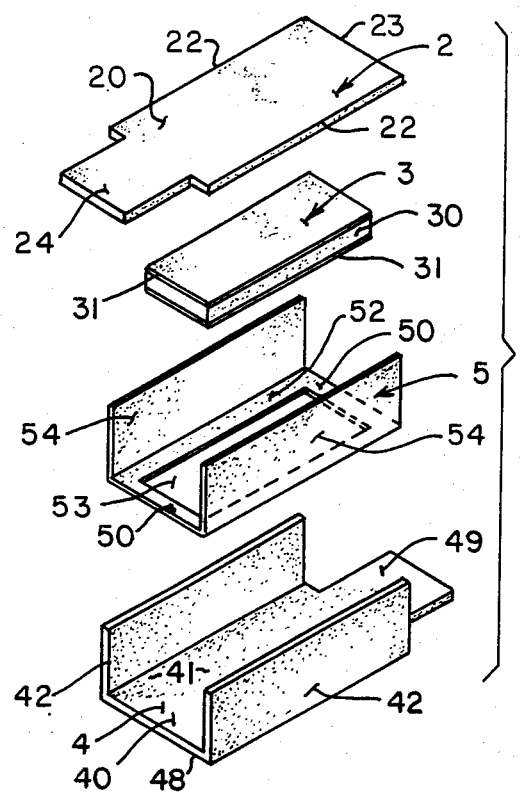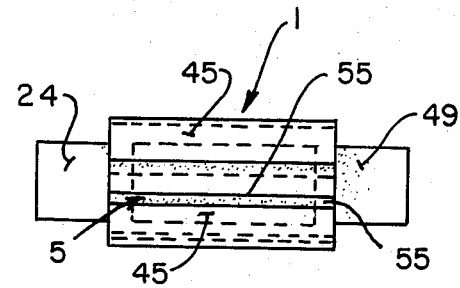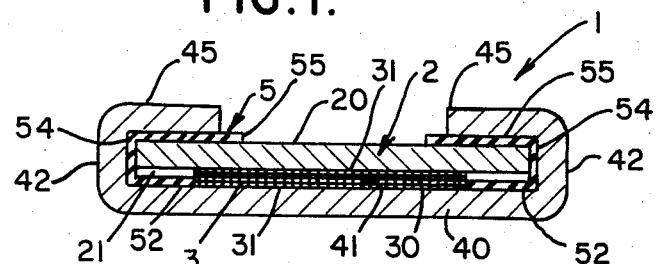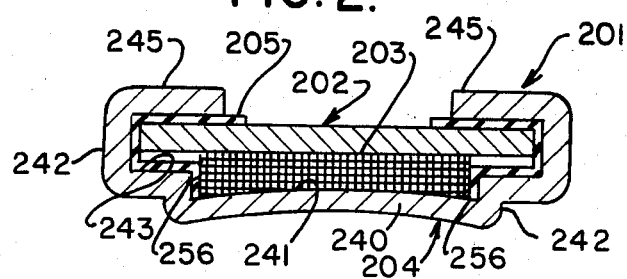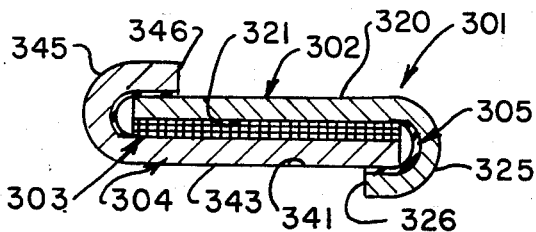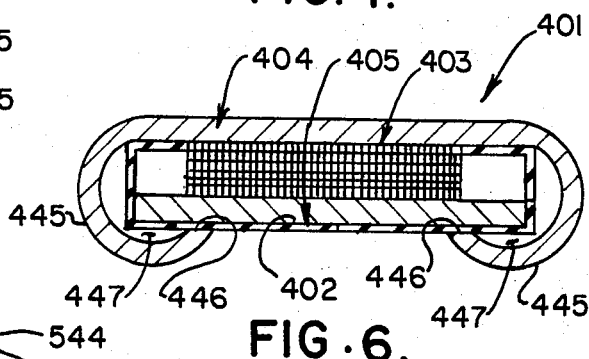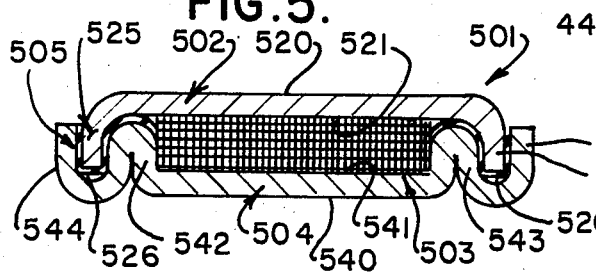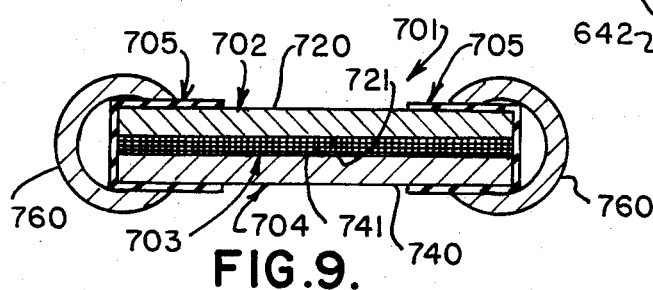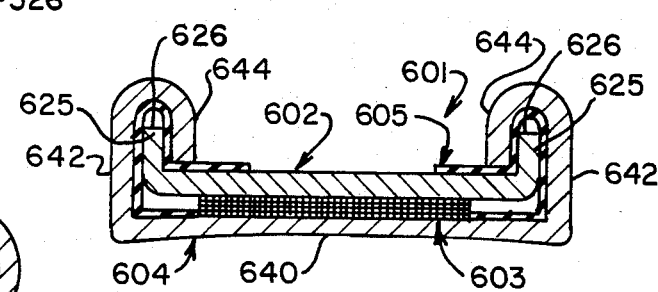

PTC THERMAL PROTECTOR

BACKGROUND OF THE INVENTION

This invention has to do with thermal protectors in which a polymeric PTC element, of the heating cable type, for example, is used. Thermal protectors of this type are already known, in which terminals are soldered to conductive foil bonded to opposite broad sides of a flat strip of PTC material. The disadvantages of such a construction are that it is labor intensive and requires careful control, that is more or less limited in its range of response times, and that is liable to have its characteristics affected by shear or tension forces applied to the PTC material, because the connection between the two terminals is made mechanically through the PTC material itself. Compressive forces have little effect upon the thermal characteristics of polymeric PTC material, compared with shear and tensile forces, at least within the limits of compressive force required in the device of this invention.

One of the objects of this invention is to provide a thermal protector that is effective, has uniform thermal characteristics, can be made with a wide range of thermal responses, and can be manufactured in high volume at low cost, automatically.

Other objects will become apparent to those skilled in the art in the light of the following description and accompanying drawing.

SUMMARY OF THE INVENTION

In accordance with this invention generally stated, a thermal protector is provided which includes a polymeric PTC element with broad upper and lower surfaces sandwiched between and held in intimate mechanical and electrical contact over substantially its entire broad surface with inner broad surfaces of upper and lower plate-terminals. Electrical insulation between the upper and lower plate-terminals outside the areas of contact of the plate-terminals and the PTC element insulate the upper and lower plate-terminals from one another electrically. The upper and lower plate-terminals are mechanically clamped together, in such a way that the PTC element is essentially protected against foreign external mechanical forces.

In the preferred embodiments, the PTC element is biased into engagement with the plate-terminals continuously. Also in the preferred embodiments, the means for clamping the upper and lower plate-terminals are integral with at least one of the plate-terminals. In the preferred embodiment, terminal parts of the plate-terminals project from opposite ends of the protector, and are integral with the plate-terminals.

BRIEF DESCRIPTION OF THE DRAWINGS

In the drawing,

FIG. 1 is a top plan view of one embodiment of thermal protector of this invention;

FIG. 2 is a transverse sectional view, enlarged for purposes of illustration, of the device shown in FIG. 1;

FIG. 3 is an expanded perspective view of the device shown in FIG. 1;

FIG. 4 is a transverse sectional view of another embodiment;

FIG. 5 is a transverse sectional view showing a third embodiment;

FIG. 6 is a transverse sectional view showing a fourth embodiment;

FIG. 7 is a transverse sectional view showing a fifth embodiment;

FIG. 8 is a transverse sectional view showing a sixth embodiment;

FIG. 9 is a transverse sectional view showing a seventh embodiment;

DESCRIPTION OF THE PREFERRED EMBODIMENTS

Figure 10:
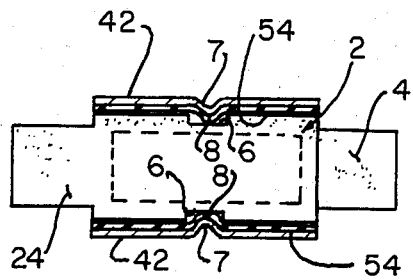
FIG. 10 is a sectional view taken along the line 10—10 of FIG. 11.

Referring now to the drawing and particular to FIGS. 1-3, for one illustrative embodiment of thermal protector of this invention, reference numeral 1 indicates an assembled thermal protector, made up of four separate parts, an upper plate-terminal 2, a PTC (positive temperature coefficient) element 3, a lower plate-terminal 4, and a insulating sheet 5. The terms "upper" and "lower" are used merely as a matter of convenience, because the thermal protector can be oriented in any direction.

The upper plate-terminal 2 is, in this embodiment, flat, elongated, and thin height-wise as compared with its length and width. It has an outer surface 20, an inner surface 21, parallel long side edges 22, a short end edge 23 and a terminal part in the form of a tab 24 integral with the rest of the upper plate-terminal, and projecting from the opposite end from the short end edge 23.

The PTC element 3 is rectangular in plan, and is also thin relative to its width and length. It is made up of a matrix or web 30 of carbon-filled polymeric material, the broad upper and lower faces of which are covered with nickel (or other suitable conductive material) foil 31. When assembled, long side edges 33 of the element 3 are parallel with the long edges 22 of the upper plate-terminal 2, and end edges 34 of the PTC element are parallel with the short end edge 23 of the upper plate-terminal, and spaced inwardly from the side edges 22, the short end edge 23, and the root end of the tab 24.

The lower plate-terminal 4 has the same length as the upper plate-terminal 2. The lower plate-terminal 4 has a bottom wall 40, with an end edge 48 aligned with the root of the terminal tab 24, and an integral tab 49, aligned at its root with the short end edge 23, hence projecting from the opposite end of the thermal protector from the tab 24. The bottom wall 40 has an inner surface 41 of the same shape but of a width greater by twice the thickness of the insulating sheet 5 than the inner surface 21 of the upper plate-terminal 2. Side walls 42, with overlying margins 45, extend along long sides of and are integral with the bottom wall 40.

The insulating sheet 5 has end frame strips 50 and side frame strips 52, defining a rectangular opening 53 of a size to receive closely the PTC element 3, side walls 54 extending along and integral with the side frame strips 52, and overlying margins 55, integral with the side walls 54.

As will be readily understood by those skilled in the art, all of the four elements that make up the thermal protector can be made in strip form and fed to a machine that will stamp, punch, form, assemble, and bend or crimp the respective parts at high speeds. The elements, as shown in the exploded view, FIG. 3, are assembled by putting the insulating sheet on the inner surface of the bottom wall of the lower plate-terminal, with the sides of the insulating material projecting above the unbent sides of the lower plate-terminal, putting the PTC element within the opening 53, framed by the frame members of the insulating sheet, placing the upper terminal on top of the PTC element, and bending the overlying margins 45 of the side walls 42 and the margins 55 of the insulating sheet over the outer surface 20 of the upper plate-terminal.

As will be explained in connection with other embodiments, either the upper plate-terminal or the lower plate-terminal, or both, can be bowed slightly convexly with respect to the PTC element, not enough to interfere with the contact between the inner surfaces of the plate-terminals and the PTC element over substantially the full surface areas of the PTC element, but enough to give a slight continuing bias toward engagement.

Merely by way of illustration, and not of limitation, in a thermal protector in which the distance between the short end edges of the plate-terminals and the roots of the terminal tabs is 3/4" and the width of the assembled protector, 7/16", with tabs 1/4" long, so that the overall length of the device is 1 1/4", the upper and lower plates can be made of brass, 0.020" thick, the insulating sheet can be Nomex paper 0.005" thick, and the PTC element, made up of the carbon-loaded polymer matrix 0.010" thick and each layer of the nickel foil 0.001" thick for a total thickness of the PTC element of 0.012". This construction, for a motor protector, provides a 12–15 second delay, which is what is desired. The soldered type provides only about 5 seconds delay. By increasing the mass of the PTC element in the present device, one can obtain various response times. It can be seen that in the construction of the thermal protector of this invention, the polymeric material can be made as thick as is desired, because it takes no stresses in shear or tension, all of those forces being exerted upon the plate-terminals.

All of the embodiments described hereinafter can be considered, for purposes of description, as having the same general shape and size as the embodiment described above, with terminal tabs integral with their respective plate-terminals. The PTC element can also be considered the same, although for purposes of illustration and to indicate that a range of thicknesses can be employed, the element is shown as being of varying thickness in the various embodiments.

Referring now to FIG. 4, reference numeral 210 indicates a second embodiment of thermal protector. The protector 201 has an upper plate-terminal 202, a PTC element 203, a lower plate-terminal 204, and an insulating sheet 205. In this embodiment, the upper plate 202 can be the same as the upper plate 2 of the first embodiment. In this embodiment, the lower plate-terminal 204 has a bottom wall 240 and side walls 242. However, the side walls 242 are stepped outwardly, to provide an interior ledge 243. The insulating sheet 205 may be provided with a riser margin 256, although that is not essential.

The bottom wall 240 in this embodiment is bowed so that an inner surface 241 of the bottom wall is convex with respect to the PTC element. The bow in the illustration in FIG. 4 is much exaggerated. In practice, the bow will be only two or three thousandths of an inch, enough to bias the PTC element continuously into engagement, even if there is a slight distortion of the element with continued use, but not enough to interfere with substantially uniform contact over the entire face of the PTC element with the inner surface 241. It can be seen that the gap shown in FIG. 4 between the upper plate-terminal inner surface and the insulated sheet overlying the ledge can be reduced to nothing, in which case, all of the crimping force of overlying margins 245 will be exerted on the plate and insulation, and none on the PTC element.

Referring now to FIG. 5, reference numeral 301 indicates a third embodiment of thermal protector of this invention, with an upper plate-terminal 302, a PTC element 303, a lower plate-terminal 304 and an insulating sheet 305. The upper plate-terminal has an outer surface 320 and an inner surface 321. It also has a margin 325 along one long edge. The lower plate-terminal has an inner surface 341, an outer surface 343 and a single margin 345 along one long edge. The upper plate margin 325 is curled around a long edge of the lower plate, and the lower plate margin 345 is curled around a long edge of the upper plate 302. As in the other embodiments, the insulating sheet lies between the upper and lower plates in every area in which mechanical and electrical contact between the two plates might otherwise occur. A virtue of this embodiment is that the upper and lower plate-terminals can be identical parts, requiring only one die or roll for both.

Referring now to FIG. 6, reference numeral 401 indicates a fourth embodiment of thermal protector of this invention, with an upper plate-terminal 402, a PTC element 403, a lower plate-terminal 404, and an insulating sheet 405. The view in this FIG., as can easily be seen, is upside down from that of the embodiments shown in FIGS. 1 and 4. The protector of this embodiment is identical with that of the embodiment shown in FIGS. 1 through 3 except that the side walls of the lower plate-terminal are curled around the long edges of the upper plate, outer edges 446 of overlying margins 445 bearing upon the outside surface of the upper plate 402, and leaving a clearance gap 447 between the rest of the overlying margin 445 and the plate. In this way, the overlying margins act as springs, biasing the upper plate toward the PTC element and the PTC element toward the inside surface of the lower plate.

Referring now to FIG. 7, reference numeral 501 indicates a fifth embodiment of thermal protector of this invention, with an upper plate-terminal 502, a PTC element 503, a lower plate-terminal 504 and an insulating sheet 505. The upper plate 502 has an outer surface 520, an inner surface 521, side walls 525 extending along the long edges of the plate, and side wall outer edges 526. The lower plate 504 has a bottom wall 540 with an inner surface 541, an inner side wall 542, an intermediate side wall 543 and an outer margin 544. As can be seen from the drawing, the intermediate side wall 543 and the outer margin 544 define between them a channel into which the side wall 525 of the upper plate extends, and into which it is crimped. In this embodiment, none of the crimping pressure need be transmitted to the PTC element. By the same token, it is desirable to put a small bow in one or both of the plates 502 and 504, so as to exert a constant compressive bias on the PTC element.

Referring now to FIG. 8, reference numeral 601 indicates a sixth embodiment of thermal protector of this invention, with an upper plate-terminal 602, a PTC element 603, a lower plate-terminal 604, and an insulating sheet 605. The upper plate-terminal 602 has side walls 625 along its long side edges, that are directed away from a bottom wall 640 of the lower plate-terminal 604. In this respect the upper plate 602 is the same as the upper plate 502 of the embodiment shown in FIGS. 7, except that it is inverted. The lower plate 604 has side walls 642 that extend height-wise above the side walls 625 of the upper plate, with outermost margins 644 curled over the side walls 625. It can be seen that in this embodiment, clamping pressure can be exerted both against the sides of the side walls 625, and against the outer surface of the upper plate, in a spring-like arrangement if desired. In the embodiment shown, the bottom wall 640 is bowed convexly with respect to the PTC element to provide additional compressive bias against the PTC element. As in all of the embodiments, the insulating sheet is interposed between the upper and lower plates wherever contact of the two plates is possible.

Referring now to FIG. 9, reference numeral 701 indicates a seventh embodiment of thermal protector of this invention, with an upper plate-terminal 702, a PTC element 703, a lower plate-terminal 704, and an insulating sheet 705. In this embodiment, the upper and lower plates can be identical, with an upper plate outer surface 720 and an upper plate inner surface 721, a lower plate outer surface 740 and a lower plate inner surface 741, and the PTC element sandwiched between them. The PTC element is shown as extending to the side edges of the plates, and the insulating sheet takes the form of separate U-shaped strips, although, as can be seen, one pair of legs of the U-shaped strips could be joined across its particular outside surface, to simplify manufacturing, for example. In this embodiment, the clamping means consists of separate C springs 760 along the two long sides. If the C springs are made of a material that is not electrically conductive, the insulating sheet could be eliminated. It can be seen that the PTC element can be put in a frame of insulating sheet, as in the embodiment shown explicitly in FIGS. 1–3, although the plates will still need to be insulated from the C springs, hence from one another, if the C springs are conductive.

Figure 11:
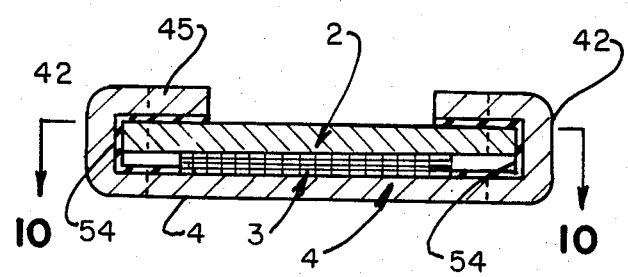
FIG. 11 is a transverse sectional view of a modified form of the device shown in FIGS. 1-3.

Referring now to FIGS. 10 and 11, because the device illustrated is a modification of the device shown in FIGS. 1 through 3, all of the common elements are indicated by the same reference numerals. The only difference is in the provision in the upper plate-terminal 2 of notches 6 on either side of the plate-terminal, and indentations 7 in the side walls 42 of the lower plate-terminal and side walls 54 of the insulating sheet 5, producing projections 8 in the inner surface of those walls extending into the notches 6. The projections 8 lock the upper and lower plate-terminals against relative movement longitudinally with respect to one another.

Figure 12:
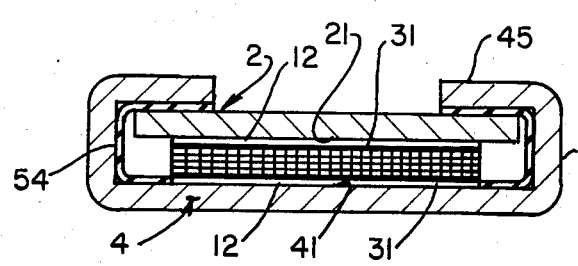
FIG. 12 is a transverse sectional view showing another modification of the device shown in FIGS. 1-3.

Referring now to FIG. 12 for another modification of the device shown in FIGS. 1 through 3, the difference in this embodiment lies in the provision of securing material 12 bonded to the upper and lower surfaces 31 of the PTC element 3, and to the inner surface 21 of the upper plate-terminal 2 and the inner surface 41 of the lower plate-terminal 4. The material 12 can take the form of solder or conductive epoxy. In the case of the solder, a layer of solder can be put on the inner surfaces 21 and 41 and on the outer surfaces 31, the device assembled, and run through an oven to melt the solder and bond the PTC element to the upper and lower plate-terminals. Epoxy can be applied conventionally. The modifications of FIGS. 11 and 12 can be combined, because it is undesirable to transmit any force in shear to the PTC element, as has been pointed out heretofore.

Figure 13:
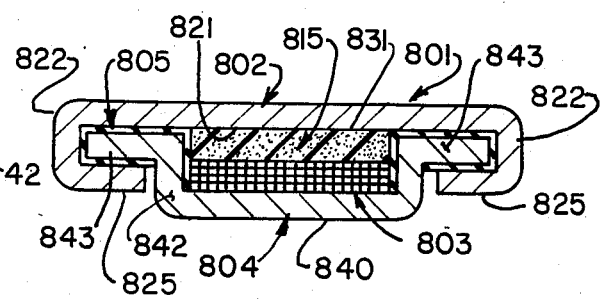
FIG. 13 is a transverse sectional view showing an eighth embodiment.

Referring now to FIG. 13, reference numeral 801 indicates an eighth embodiment of thermal protector. The thermal protector 801 has an upper plate-terminal 802, a PTC element 803, a lower plate-terminal 804 and an insulating sheet 805. The lower plate-terminal 804 has a bottom wall 840, side walls 842 and, integral with the side walls 842, out-turned flanges 843. The upper plate-terminal 802 has side walls 822 and underlying margins 825 tightly engaging the flanges 843, with insulating sheet 805 sandwiched between them. In this embodiment, a strip of resilient electrically conductive rubber 815 is interposed between an inner surface 821 of the upper plate-terminal 802 and an upper surface 831 of the PTC element 803, and is compressed therebetween. The resilience of the rubber "spring" 815 insures constant electrical contact between the PTC element 803 and the upper and lower plate-terminals 802 and 804.

Figure 14:
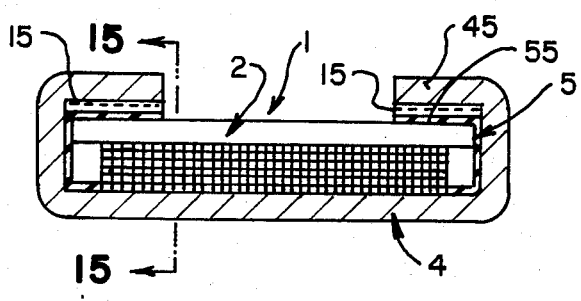
FIG. 14 is a transverse sectional view of yet another modification of the device shown in FIGS. 1-3.
Figure 15:
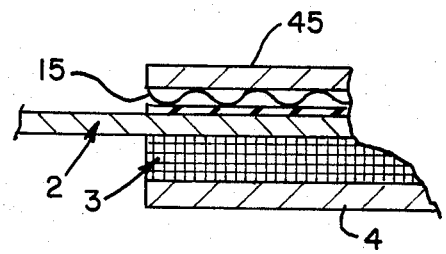
FIG. 15 is a fragmentary sectional view taken along the line 15—15 of FIG. 14.

Referring now to FIGS. 14 and 15 for yet another modification of the device shown in FIGS. 1 through 3, the difference in construction between the protector shown in FIGS. 1 through 3 and that of FIGS. 14 and 15 is the provision of a spring 15 between the overlying margins 45 of the lower plate-terminal 4 and the overlying margins 55 of the insulating sheet 5, so that the upper plate-terminal 2 is continuously spring biased toward and into contact with the PTC element, which in turn is biased against the inner surface of the lower plate-terminal 4.

Figure 16:
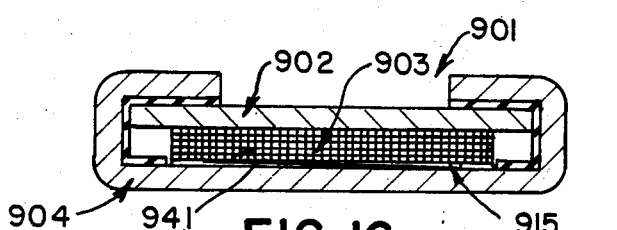
FIG. 16 is a transverse sectional view showing a ninth embodiment.
Figure 17:
FIG. 17 is a top plan view of one form of spring suitable for use in the embodiment shown in FIG. 16.
Figure 18:
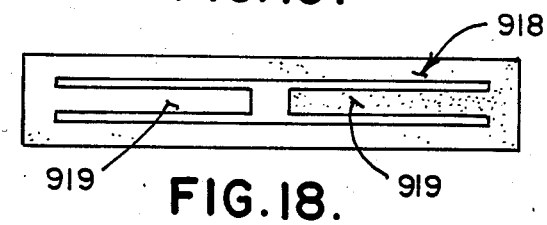
FIG. 18 is a top plan view of another form of spring suitable for use in the embodiment shown in FIG. 16.
Figure 19:
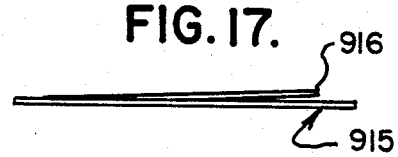
FIG. 19 is a view in side elevation showing a leaf of the spring shown in FIG. 17 or of one of the leaves of the spring shown in FIG. 18.

Referring now to FIG. 16, reference numeral 901 indicates a ninth embodiment, which resembles the embodiment shown in FIGS. 1 through 3 but for the provision of a spring 915, sandwiched between a PTC element 903 and an inner surface 941 of a lower plate-terminal 904. The spring 915 is made of electrically conductive, stiffly springy material. In the embodiment shown in FIGS. 16, 17 and 19, the spring has a single leaf 916 stuck up symmetrically along the long axis of the rectangular body of the spring. In FIG. 18, another embodiment of spring 918 is shown, in which two, facing leaves 919 are struck up from the body of the spring. The springs 915 and 918 can be oriented either transversely or longitudinally of the thermal protector, and the widths of the bodies of the spring and of the leaves can be varied as desired. In either event, the initial compression of the springs is such as to flatten the leaf or leaves so that the contact of the PTC element is substantially over the entire surface of the PTC element.

Numerous variations in the construction of the thermal protector of this invention, within the scope of the appended claims, will occur to those skilled in the art in the light of the foregoing disclosure. Merely by way of example, both upper and lower plates may be bowed, and springy clamping means may be employed with bowed plates as well. Other expedients may be used to prevent longitudinal displacement of the upper and lower plates with respect to one another, such, for example, as by dimpling overlying margins, or by providing a projecting finger on the short ends of the plates, and bending it down, over a corresponding piece of insulating, over the end edge between the side edge and the tab. The tabs can be made in any length and any width desired, and may be punched or otherwise formed to take conductors to which they are to be attached. The tabs can be offset from one another laterally, or bent in opposite directions, and formed to project from the same end of the thermal protector. It will be seen that because the PTC element is not bonded to the plate-terminals except in the embodiment shown in FIG. 12, it is subjected only to compressive force, which, as has been pointed out, does not affect the thermal characteristics of the PTC element as much as forces in shear or tension. In the embodiment in which it is bonded, provision is made for preventing relative replacement of the upper and lower plate-terminals. Other configurations of the plates, clamping means, PTC elements and insulating sheet will be readily apparent, that embody the concept common to the embodiments described of a simple thermal protector utilizing a polymeric PTC element in such a way that the element is subjected only to compressive forces, easy to manufacture, requiring few parts, and very little labor. The variations described are merely illustrative.

We claim:

1. A thermal protector comprising a polymeric PTC element, with broad upper and lower surfaces; upper and lower electrically conductive plate terminals each having a broad inner surface, said polymeric PTC element being sandwiched between and held in intimate electrical contact over substantially its entire broad upper and lower surfaces with said inner surfaces of said upper and lower plate-terminals, respectively; electrical insulation means between said upper and lower plate-terminals outside the areas of contact of said plate-terminals and said PTC element for electrically insulating said upper and lower plate-terminals from one another, and means for mechanically clamping said plate-terminals together, said clamping means being integral with at least one of said plate-terminals.

2. The protector of claim 1 wherein the said electrical insulation means is a unitary sheet with end frame strips and side frame strips defining an opening of a size to receive closely said PTC element.

3. The protector of claim 1 wherein the clamping means are springy and are shaped and positioned continously to bias said plate-terminals toward one another and against said broad surface of said PTC elements.

4. The protector of claim 1 wherein at least one of said plate-terminals is bowed convexly with respect to said PTC element an amount insufficient to interfere with the contact between the PTC element and said plate-terminal but sufficient to ensure continued contact.

5. The protector of claim 1 wherein the clamping means comprises opposite long outer margins of one of said plate-terminals, extending beyond long edges of the other of said plate-terminals and embracing said long edges and overlying a portion of an outer surface of said other of said plate-terminals.

6. The protector of claim 5 wherein said opposite long outer margins are curled over said outer surface and engage the insulating means along said outer surface substantially at the outer edges of the margins, the springiness of said margins serving continously to bias said other plate-terminal toward said PTC element.

7. The protector of claim 5 wherein said outer margins include a side wall, defining with said inner surface a trough in which said PTC element is mounted, said side wall being stepped outwardly to define an inner ledge, the outer edges of said other plate-terminal being clamped between said ledge and inner surfaces of said overlying outer margins.

8. The protector of claim 7 wherein a bottom wall of said trough is bowed convexly relative to said PTC element an amount insufficient to interfere with the contact between the PTC element and said plate-terminal but sufficient to ensure continued contact in response to height-wise distortion of said PTC element.

9. The protector of claim 1 wherein the clamping means comprises a long margin of each of said plate-terminals extending beyond a corresponding long edge of the other of said plate-terminals, embracing said long edge and overlying a portion of an outer surface of said other of said plate-terminals.

10. The protector of claim 1 wherein the clamping means comprises long margins of said plate-terminals extending at substantially right angles to said broad inner surfaces and engaging one another, whereby the clamping forces between the engaged margins are substantially isolated from the PTC element.

11. The protector of claim 10 wherein a margin of at least one plate-terminal extends beyond a marginal edge of the other plate-terminal and around said other plate-terminal marginal edge and overlies another side of said marginal edge.

12. The protector of claim 7 wherein at least one of said plate-terminals is bowed convexly relative to said PTC element an amount insufficient to interfere with the contact between the PTC element and said plate-terminal but sufficient to ensure continued contact in response to heightwise distortion of said PTC element.

13. The protector of claim 1 wherein said clamping means depend solely upon fricitonal engagement to secure said plate-terminals from movement with respect to one another.

14. The protector of claim 1 including means for biasing said PTC element continously into engagement with said inner surfaces of said plate-terminals.

15. The protector of claim 1 wherein each plate-terminal has a terminal part integral therewith and extending beyond said PTC element.

16. The protector of claim 15 wherein the said terminal parts project from opposite ends of said protector.

17. The protector of claim 14 wherein said means for biasing comprises spring means interposed between the means for clamping the plate-terminals together and one of said plate-terminals exteriorly of said plate-terminal.

18. The protector of claim 1 including means for positively inhibiting longitudinal displacement of one of said plate-terminals with respect to the other.

* * * * *